(12) United States Patent
Riddiford

(10) Patent No.: US 7,355,843 B2
(45) Date of Patent: Apr. 8, 2008

(54) COMPUTER WITH A PEN OR TOUCH SENSITIVE DISPLAY

(75) Inventor: Martin Philip Riddiford, London (GB)

(73) Assignee: Psion Digital Limited, London (GB)

( * ) Notice: Subject to any disclaimer, the term of this patent is extended or adjusted under 35 U.S.C. 154(b) by 466 days.

(21) Appl. No.: 10/984,472

(22) Filed: Nov. 9, 2004

(65) Prior Publication Data

US 2005/0083311 A1    Apr. 21, 2005

Related U.S. Application Data

(63) Continuation of application No. 10/005,751, filed on Nov. 7, 2001, now Pat. No. 6,870,730, which is a continuation of application No. 09/053,329, filed on Apr. 1, 1998, now abandoned, which is a continuation-in-part of application No. 08/723,882, filed on Sep. 23, 1996, now Pat. No. 5,742,475.

(30) Foreign Application Priority Data

Sep. 26, 1995   (GB)  .................................. 9519556

(51) Int. Cl.
*G06F 1/16*   (2006.01)
(52) U.S. Cl. .................. 361/681; 361/683; 345/905
(58) Field of Classification Search ............... 361/683; 345/905
See application file for complete search history.

(56) References Cited

U.S. PATENT DOCUMENTS

| | | | |
|---|---|---|---|
| 4,960,256 A | 10/1990 | Chihara et al. | |
| 5,103,376 A | 4/1992 | Blonder | |
| 5,144,290 A * | 9/1992 | Honda et al. | 345/905 |
| 5,168,426 A | 12/1992 | Hoving et al. | |
| 5,179,502 A | 1/1993 | Matsuda | |
| 5,196,993 A * | 3/1993 | Herron et al. | 361/681 |
| 5,200,913 A | 4/1993 | Hawkins et al. | |
| 5,206,790 A | 4/1993 | Thomas et al. | |
| 5,267,123 A | 11/1993 | Boothroyd et al. | |
| 5,268,817 A | 12/1993 | Miyagawa et al. | |

(Continued)

FOREIGN PATENT DOCUMENTS

DE      39 26 189 A1    2/1990

(Continued)

OTHER PUBLICATIONS

"Membranes Help Open and Close Computer Case," *Design Engineering* (Aug. 1992) London, GB.

(Continued)

*Primary Examiner*—Lisa Lea-Edmonds
(74) *Attorney, Agent, or Firm*—Knobbe, Martens, Olson & Bear, LLP

(57) ABSTRACT

A computer with a touch sensitive or pen sensitive display is disclosed in which the position of the fully opened display has been designed in order that the torque typically applied to the top most pen or touch sensitive part of the display, in relation to a rotational axis about which the computer would rotate if it were to tip backwards, is less than that needed to cause the computer to tip backwards about that rotational axis. The computer is therefore stable even when the display is being touched by pen or finger, unlike conventional clam shell designs.

14 Claims, 6 Drawing Sheets

U.S. PATENT DOCUMENTS

| | | |
|---|---|---|
| 5,345,362 A | 9/1994 | Winkler |
| 5,355,279 A * | 10/1994 | Lee et al. .................. 345/905 |
| 5,375,076 A | 12/1994 | Goodrich et al. |
| 5,383,138 A | 1/1995 | Motoyama et al. |
| 5,396,399 A | 3/1995 | Blair et al. |
| 5,402,151 A | 3/1995 | Duwaer |
| 5,534,891 A | 7/1996 | Takano |
| 5,548,478 A | 8/1996 | Kumar et al. |
| 5,559,670 A | 9/1996 | Flint et al. |
| 5,583,742 A | 12/1996 | Noda et al. |
| 5,636,101 A | 6/1997 | Bonsall et al. |
| 5,644,469 A | 7/1997 | Shioya et al. |
| 5,657,258 A | 8/1997 | Grewe et al. |
| 5,712,760 A | 1/1998 | Coulon et al. |
| 5,742,475 A | 4/1998 | Riddiford |
| 5,754,395 A | 5/1998 | Hsu et al. |
| D394,848 S | 6/1998 | Riddiford |
| 5,777,281 A | 7/1998 | Riddiford |
| 5,796,575 A | 8/1998 | Podwalny et al. |
| 6,016,248 A | 1/2000 | Anzai et al. |
| 6,052,279 A | 4/2000 | Friend et al. |

FOREIGN PATENT DOCUMENTS

| | | |
|---|---|---|
| EP | 0 674331 A1 | 9/1995 |
| JP | 3-150588 | 6/1991 |
| JP | 3-240090 | 10/1991 |
| JP | 4-188208 | 7/1992 |
| JP | 5-53687 | 3/1993 |
| WO | WO 91/17493 | 11/1991 |

OTHER PUBLICATIONS

"Apple eMate", dated Mar. 24, 1998 from <www.apple.com>.

* cited by examiner

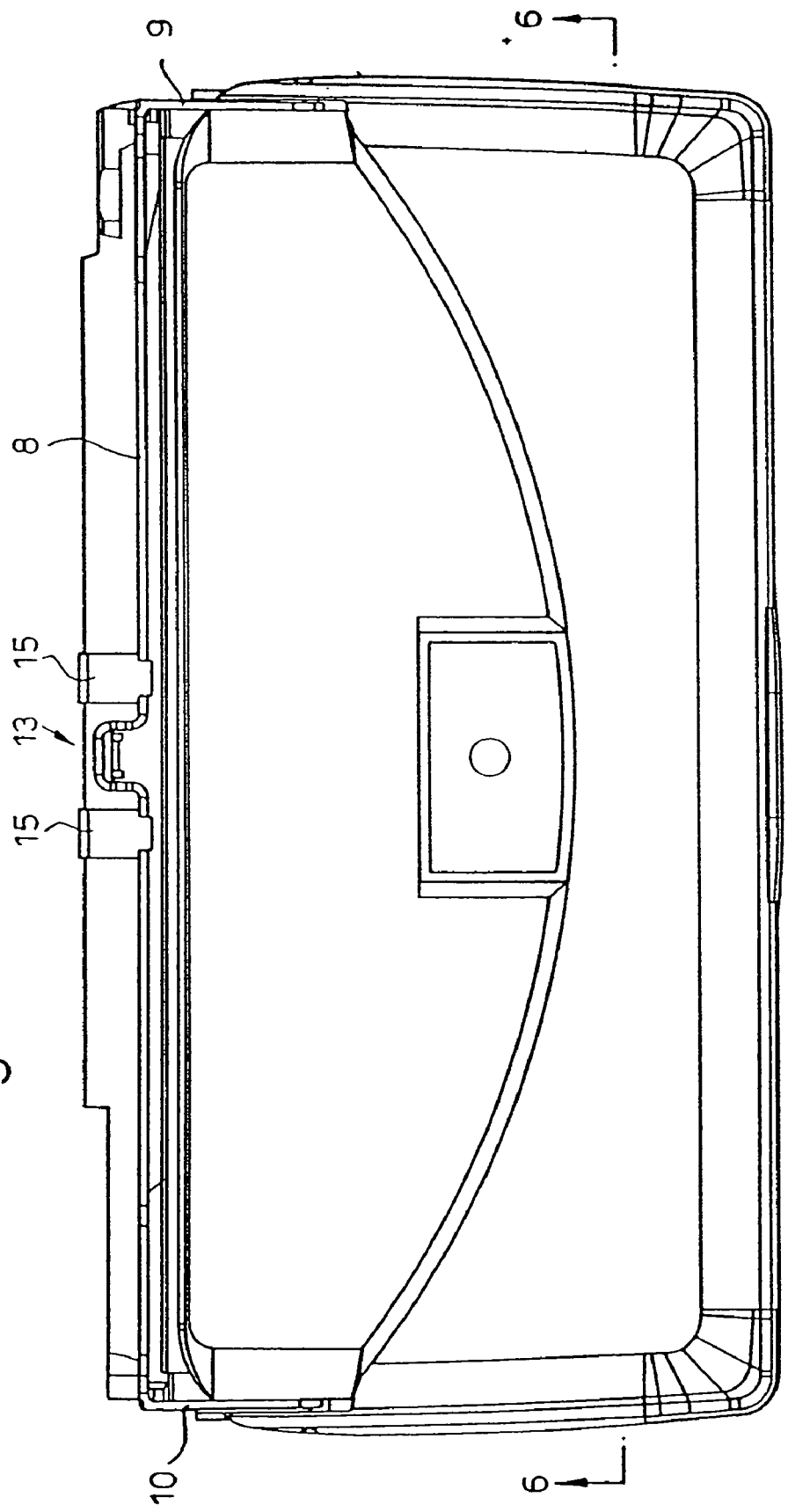

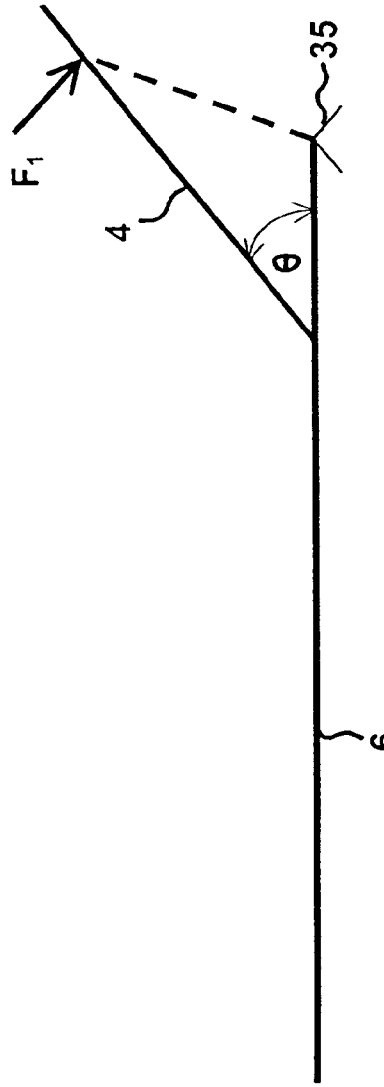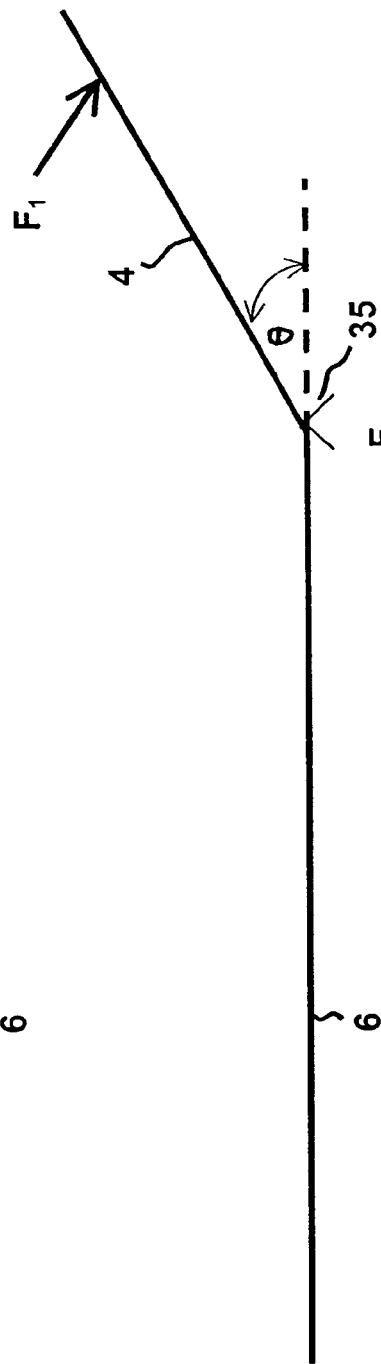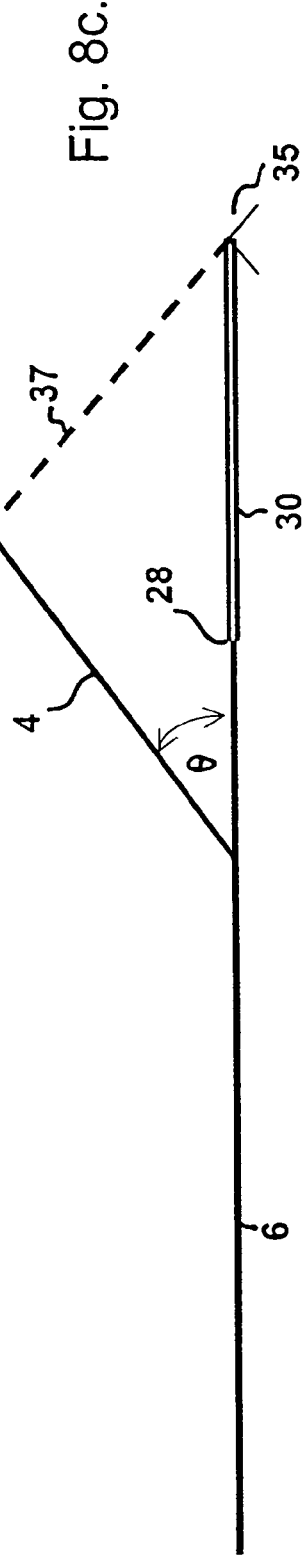

COMPUTER WITH A PEN OR TOUCH SENSITIVE DISPLAY

RELATED APPLICATIONS

The present application is a continuation of U.S. patent application Ser. No. 10/005,751, filed Nov. 7, 2001, now U.S. Pat. No. 6,870,730 entitled "Computer With a Pen or Touch Sensitive Display," which is a continuation of U.S. patent application Ser. No. 09/053,329, filed Apr. 1, 1998, entitled "Computer With a Pen or Touch Sensitive Display," now abandoned. application Ser. No. 09/053,329, is a continuation-in-part of U.S. application Ser. No. 08/723,882, filed Sep. 23, 1996 now U.S. Pat. No. 5,742,475 entitled "Computing Equipment Casing Having Hinged, Spring Loaded and Sliding Leaves," which issued on Apr. 21, 1998 as U.S. Pat. No. 5,742,475. The contents of each of the forgoing applications, in their entirety, are hereby incorporated by reference. Application Ser. No. 08/723,882 (now U.S. Pat. No. 5,742,475) claims foreign priority benefit of United Kingdom Application No. 9519556, and the present application hereby claims foreign priority benefit of United Kingdom Application No. 9519556, filed Sep. 26, 1995.

BACKGROUND OF THE INVENTION

1. Field of the Invention

This invention relates to computers with a pen or touch sensitive display, for example palmtop and notebook computers running a pen-enabled operating system.

2. Description of the Prior Art

In portable computer design, one typically wants to include a large display, yet keep the overall size of the computer as compact as possible. Successfully reconciling these two requirements is one of the more difficult problems facing the designer of portable computers. There are two well established solutions to this problem: Conventional portable computers, such as PDAs (Personal Digital Assistants), palmtops, sub-notebooks and notebooks, generally use either a tablet or a clam shell design. An example of a tablet design is the Apple Newton PDA from Apple Computers, Inc. In a tablet, the computer is a one-piece unit with a display occupying much of the upper surface. In the clam shell design, the display is usually hinged at or near the rear of the computer. The clam shell approach is used in the Psion Series 3a palmtop from Psion Computer PLC and virtually all sub-notebooks and notebooks. Both approaches enable a display that occupies much of the footprint of the device to be used.

The clam shell approach can bring its own problems: in early notebook designs (for example in the late 1980s), the display was far heavier than it is in today's machines. That was in large part because of the relatively thick glass used at that time and the type of display technology used. U.S. Pat. No. 4,960,256 to Sony Corporation from 1988 notes that some clam shell notebooks can tip backwards after the display has been opened up for viewing. That happens when a vertical line drawn through the center of gravity of the computer does not fall within the base of the computer but instead falls to the rear of and outside of the computer. The Sony patent teaches a hinge that enables the lower edge of the display to slide forwards when the display is opened up for viewing. Moving the base of the display forwards in this manner ensures that the center of gravity of the computer does not shift backwards when the display is fully opened so much that the computer tips backwards.

The Sony patent does not, however, relate to a computer with a pen or touch sensitive display. There are now however numerous PDAs with clam shell designs that include pen sensitive displays. These PDAs include the Philips Velo and various palmtops from Hewlett-Packard. One characteristic of these devices is that they use the Microsoft Windows CE (TM) operating system, which provides for pen input for selecting on-screen buttons, drop down windows, and electronic inking. However, a major design failing of these clam shell computers is that they topple over backwards if anything more than a very light pen touch, for example, 20 g-force, is applied to the display screen. In practice this requires the user to grasp the computer manually to prevent it toppling backwards.

Reference may also be made to U.S. Pat. No. 5,267,123 to EO Europe Limited. This discloses a notebook format light pen computer which, when closed, has the display upper-most. The display can be slid backwards to reveal a keyboard and can be inclined to a suitable viewing angle. Hence, it can operate as both a tablet (i.e. with the lid fully closed) and as a combination keyboard and light pen driven device. The display screen has a rear support which gives the display some rigidity with respect to the base of the computer: i.e. it prevents the display from moving back towards a horizontal position under pen pressure even when the base remains stable. Prior art such as the EO Limited patent relate to full sized laptops dating from 1990 and the base and display used in such a device would have been heavy. Hence, no specific design features appear to have been included in order to minimize the torque associated with pen or touch input to the screen below a threshold level.

SUMMARY OF THE INVENTION

In accordance with the present invention, there is provided a computer with a touch sensitive or pen sensitive display, in which the position of the fully opened display is such that the maximum torque typically applied to the top most pen or touch sensitive part of the display, in relation to a rotational axis about which the computer would rotate if it were to tip backwards, is less than that needed to cause the computer to tip backwards about that rotational axis but would be sufficient, if the display were hinged in a conventional clam shell arrangement at the rear of the computer either to cause such tipping as to cause the display to be rotated away from a normal viewing portion.

Hence, the present invention is premised on the insight that designing a computer with a relatively large pen or touch sensitive display, that does not tip backwards when the display is tapped with a pen or a finger, is a technical problem that can be solved by the careful engineering or empirical handling at the design stage of the torques that will be applied to the computer in normal use. Generally, this will be achieved through extensive, detailed models of various designs.

As explained in the previous section, prior art workers in effect accepted that obtaining the benefits of a relatively large display meant hinging the display at the rear of the computer. While a screen that is light enough (or a base that is heavy enough) may well lead to such a clam shell design that is statically stable (i.e. the center of gravity of the computer passes through the base of the computer even with the display fully open), the large number of Microsoft Windows CE based clam shell PDAs now available require the user to grasp these devices to prevent them tipping backwards when touching the screen with anything more than very light pen pressure. That in turn has severely restricted the use of touch sensitive (as opposed to pen sensitive) on-screen buttons, drop down menus etc. on such machines: touch sensitivity requires a greater degree of stability than stability under pen input since a finger will generally apply a greater force than a pen in order to activate the button.

On the other hand, a computer in accordance with the present invention will not only be statically stable, but also will be stable when the display is used for a wide range of pen and finger activated tasks, even where the pen or finger touches an area near the top of the screen, where the torque it applies will be the greatest because the length of the moment arm about the turning axis is the longest. Hence, pen and finger activated menus that drop-down from the top of the screen and all other pen and finger activated features can confidently be used in a computer according to the present invention because the torques have been carefully determined to be insufficient to cause toppling.

As explained above, the prior art to this invention fails to disclose the design theory of deliberately minimizing the torque associated with pen or touch input to the screen below a threshold level. Such a design feature only becomes desirable when without it you have a computer that would too readily topple backwards when its display is touched by a finger or pen. With the weight of components typically used in the current generation of mass market portable computers, a computer that is sub-notebook size or smaller will generally benefit from the present invention. However, the scope of the present invention should not be construed as limited to any size of computer.

The torque associated with typical pen or finger contact to the display can be reduced to below the amount that would cause toppling by sufficiently reducing the length of the moment arm, i.e. the length of the distance from the point of application of the turning force to the rotational axis about which the computer would rotate if it were to tip backwards.

In accordance with the invention, this can be done in one of three ways: (I) by using a hinge that will cause the display, when fully opened, to be displaced forward from, but substantially parallel to, the fully open position it could be in if the display were hinged at a fixed point at the rear of the computer; (II) by using a hinge that will cause the display, when fully opened, to be displaced downwards from the position it could be in if the display were hinged at a fixed point at the rear of the computer and (III) by extending the rear of the computer, for example with rearward facing feet. In practice, a combination of two or more approaches may be used, although the first approach is generally the most useful.

In the first approach, the typical maximum torque (i.e. based upon a reasonable upper limit to the touch or pen force) applied to the display in an ordinary viewing position can be compared theoretically with the typical maximum torque that would be applied to a display in an ordinary viewing position in a clam shell design. In the latter, the torque may be sufficient to cause the computer to tip backwards unless it is externally supported, for example by hand. If that is the case, then the problem can be solved using a hinge as described above which displaces the display forwards.

An added effect of moving the display forward is that the center of gravity of the entire computer also moves forward. This increases the torque resisting backward tipping, which in magnitude is the product of (i) the weight of that part of the computer which is forward of the rotational axis about which the computer would tip, and (ii) the distance from the rotational axis to the center of gravity associated with that part of the computer. That is the same as the product of the total weight of the computer and the distance from the rotational axis to the true center of gravity of the whole computer.

If the third approach is used, then the rearward feet can be fixed and permanent, extend back as the display opens up or be manually extendible. The use of rearward facing feet however, is advantageous only when the computer is placed on a flat surface. On uneven surfaces, such as one's lap, the computer will not be very stable.

In a preferred embodiment, the keyboard of the computer is mounted via slide members directly to the base of the computer. In this way, the keyboard can slide forward as the display slides forward and up to a viewing position. The opening, pivotal movement of the display relative to the keyboard causes a sliding movement of the keyboard relative to the base. This is particularly convenient since a single pivoting movement of the display relative to the keyboard will also cause the sliding movement.

Preferably, the position of the fully opened keyboard is designed in order that the torque typically applied to the part of the keyboard closest to the user, in relation to a rotational axis about which the computer would rotate if it were to tip forwards, is less than that needed to cause the computer to tip forwards about that rotational axis.

In a further aspect of the invention, there is provided a computer with a touch sensitive or pen sensitive display, in which the position of the fully opened display is such that the maximum torque typically applied to the top most pen or touch sensitive part of the display, in relation to a rotational axis about which the computer would rotate if it were to tip backwards, is less than that needed to cause the computer to tip backwards about that rotational axis, and which further includes a hinge that allows the base of the display to move forwards during either opening or closing.

BRIEF DESCRIPTION OF THE DRAWINGS

An example of a portable, palmtop computer according to the invention will now be described with reference to the accompanying drawings, in which:

FIG. 2 is a plan view showing the computer in its closed position but with a rear cover removed;

FIG. 8*a* illustrates the forces applied to the computer of FIG. 1 in one embodiment of the invention.

FIG. 8*b* illustrates the forces that would be applied where the screen is placed at the rear of the base.

FIG. 8*c* illustrates the forces applied to the computer of FIG. 1 with rearward extending legs.

DETAILED DESCRIPTION OF THE PREFERRED EMBODIMENT

Figure 1:
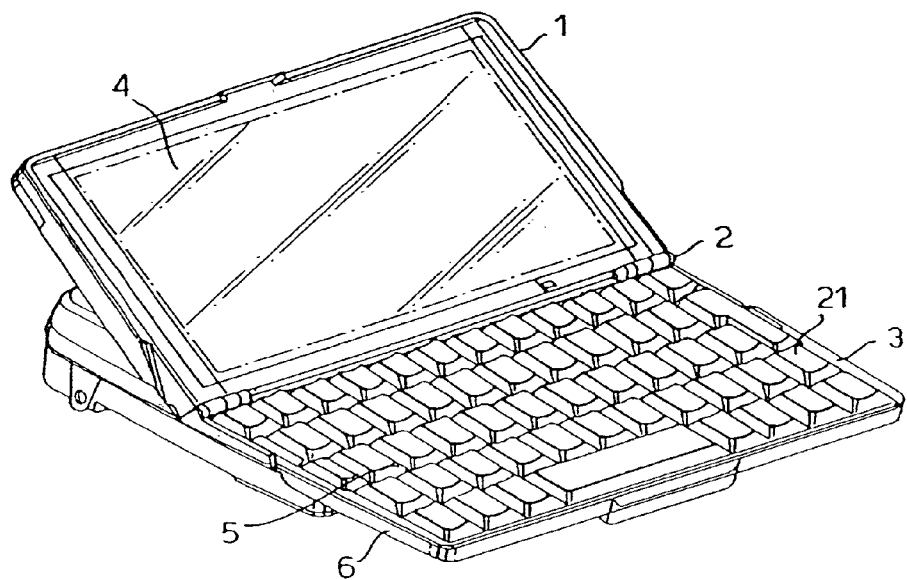
FIG. 1 is a perspective view from above showing the computer in its open position.

The computer shown in the drawings comprises a casing having a first, upper leaf 1 which is hinged at 2 to a second, lower leaf 3. The upper leaf 1 supports a touch screen 4 while the lower leaf 3 supports a keyboard 5. In addition, a microprocessor (not shown) is mounted within the lower leaf 3 and is electrically connected to the keyboard 5 and the touch screen 4. The lower leaf 3 is slidably mounted on a base 6. The rear section of the base 6 incorporates a battery housing 7 (FIGS. 3-5) for supplying power to the microprocessor and other circuit elements.

In its closed position (FIGS. 2 and 3) the upper leaf 1 is folded over the base 6 and it will be seen that the lower leaf 3 has retracted into the base 6 so as to be substantially invisible (other than its sides) in the closed position.

The upper leaf 1 is connected to the base 6 via a torsion spring 8 having a pair of laterally spaced arms 9,10 at its ends, each of which terminates in a laterally outwardly extending hook 11. Each hook 11 is received in a respective aperture 12 in the side of the casing 1. A central section 13 of the torsion spring 8 is formed into a U-shape and is clamped onto a mounting 14, fixed to the base 6, by clamp members 15. The torsion spring 8 is formed to as to define an over center mechanism urging the leaf 1 either into the closed position shown in FIG. 3 or the fully open position shown in FIG. 5.

The leaf 3 carrying the keyboard 5 is slidably mounted to the base 6 due to engagement between a chassis member 16 forming part of the base 6 and a base member 17 of the keyboard 5. The interlocking engagement between the chassis member 16 an the base member 17 can be seen more clearly in FIG. 7. The chassis member 16 is secured to a support plate 18 while the base member 17 of the keyboard 5 rests slidably on the chassis member 16.

Figure 6:
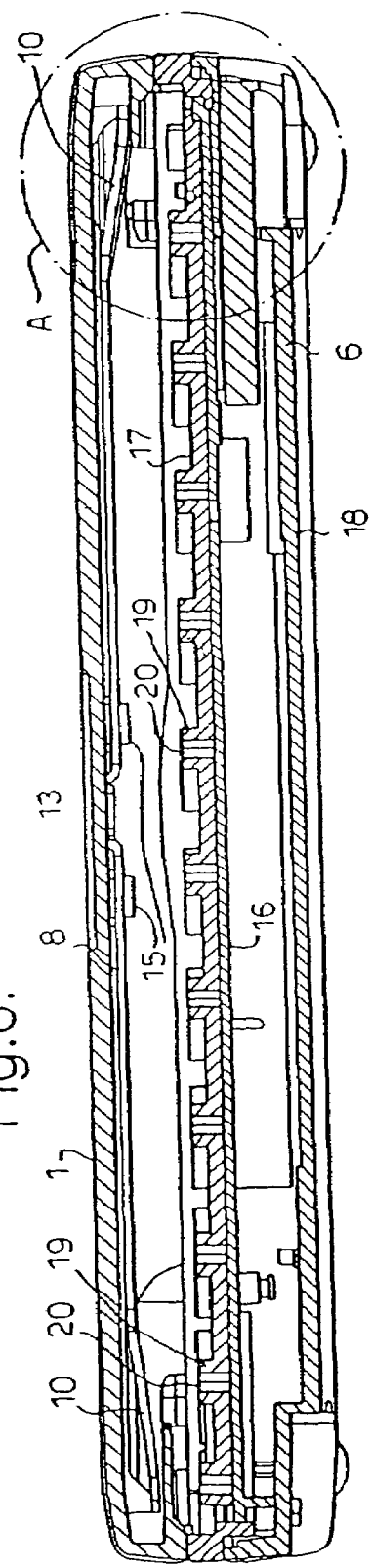
FIG. 6 is a cross-section taken on the line 6-6 in FIG. 2.
Figure 7:
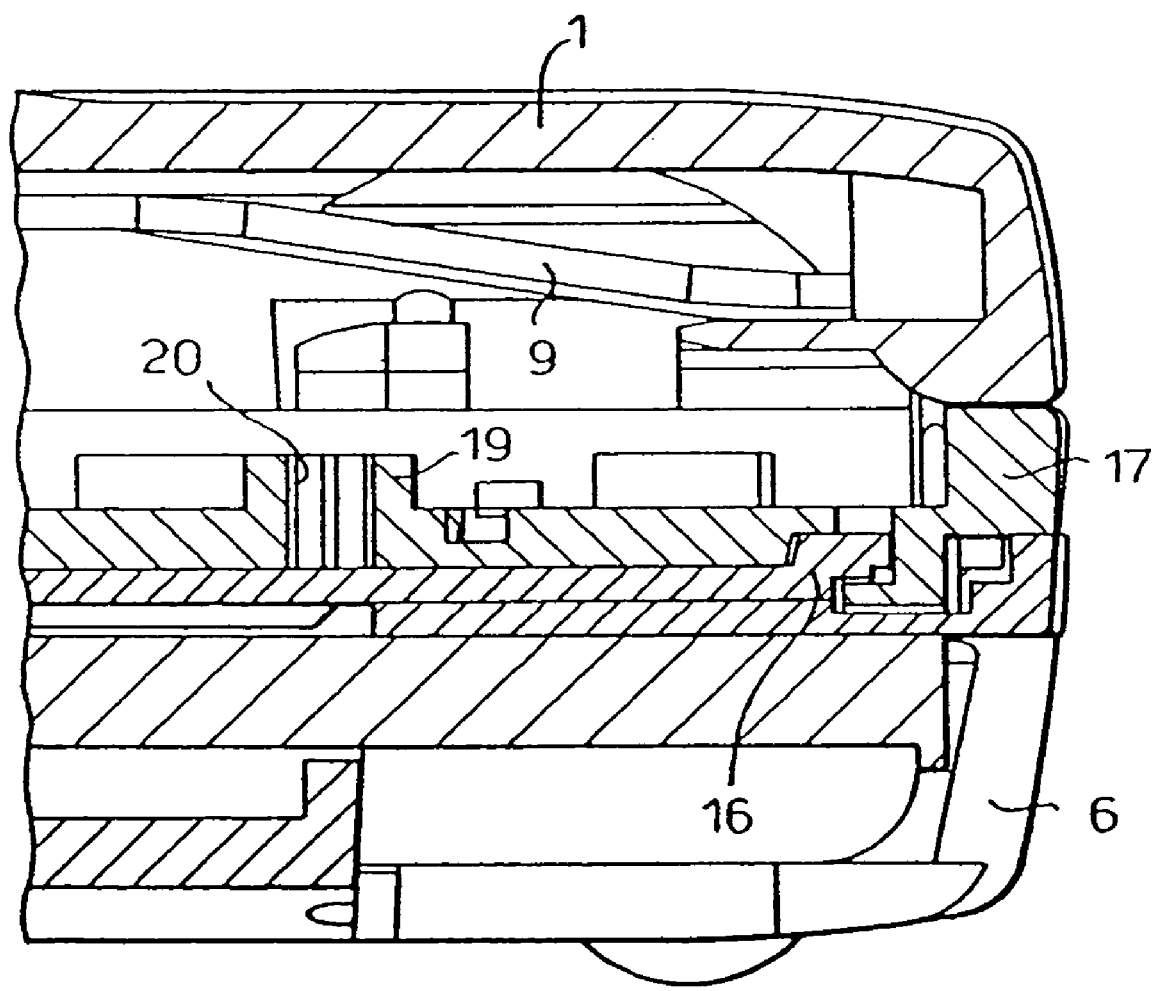
FIG. 7 is an enlarged view of detail A in FIG. 6.

The base member 17 has a number of upstanding bosses 19 defining respective bores 20 some of which are indicated in FIG. 6 and FIG. 7. Each boss 19 supports a respective key 21 of the keyboard 5 which has, on its underside, a depending spigot (not shown) which is received within the cruciform shaped bore 20. The construction of the keyboard can have a variety of forms but in the preferred arrangement is in accordance with the key assembly described and claimed in our co-pending patent application of even date entitled "Key Assembly" and claiming priority from British Patent Application No. 95195574.

Figure 3:
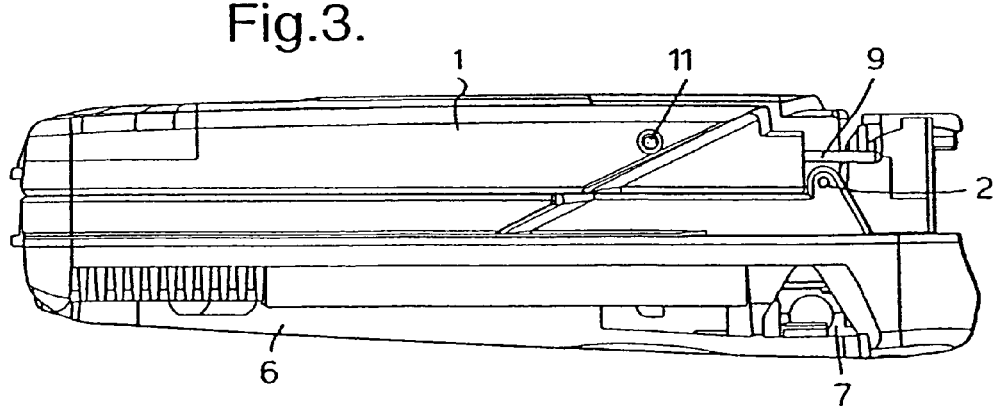
FIGS. 3-5 are side elevations showing the computer in closed, partially open and fully open positions respectively.
Figure 4:
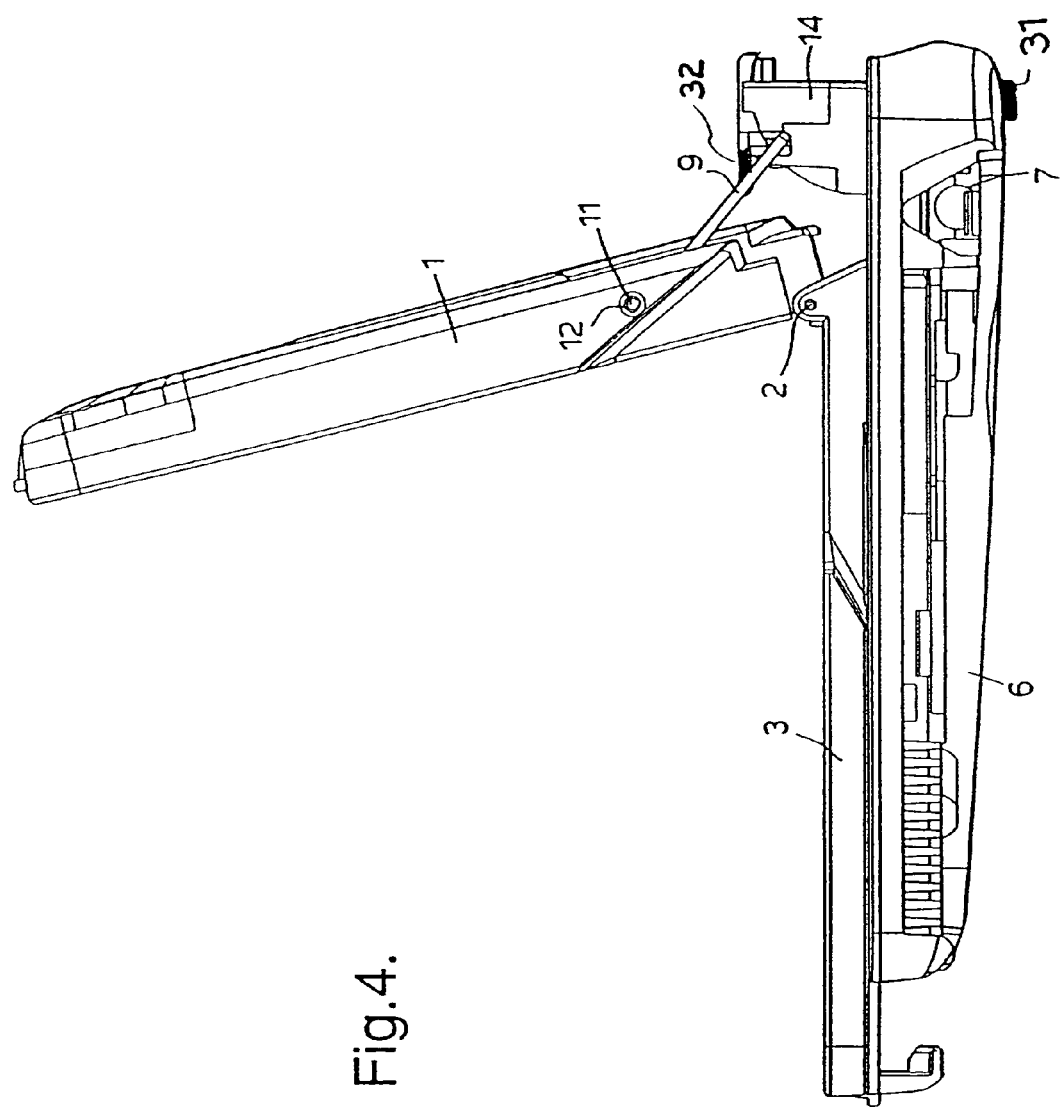
Figure 5:
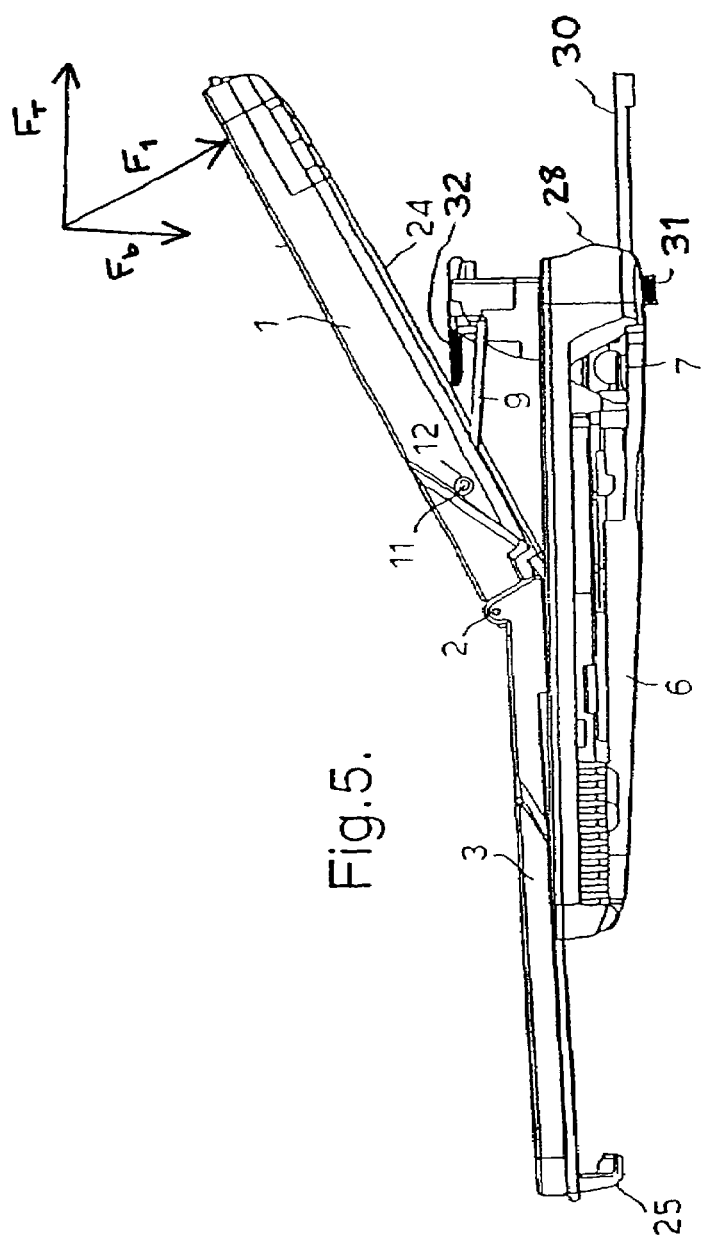

The operation of the leaves can be seen most easily by comparing FIGS. 3, 4 and 5. Thus, initially the casing is in its closed position as shown in FIG. 3 in which the leaf 1 rests on the base 6 with the leaf 3 refracted. The user then grasps the free end of the leaf 1 and raises it as shown in FIG. 4. This movement is against the resilience of the torsion spring 8 which tends to urge the leaf 1 towards its closed position at this stage. As the leaf 1 is raised, it will pivot about the hooks 11 so that the leaf 3 is slid forwardly along the base 6. At the same time, the torsion spring 8 rotates about its longitudinal axis. Further opening movement of the leaf 1 pushes the leaf 3 further forward until a rear surface 24 of the leaf 1 engages parts of the torsion spring arms 9, 10 and further movement is prevented. The position of the leaves 1, 3 is then as shown in FIGS. 1 and 5.

In one embodiment of the present invention, used in the Psion Series 5 handheld computer, the system has advantageously the following specifications. The size of the base is advantageously approximately 170 mm×85 mm, with the base weighing about 132 grams. The keyboard weighs about 57 grams, and typical batteries used with the computer weigh about 56 grams. Each of these weights are included in the total operating weight of 245 grams of the base 6. The size of the screen is approximately 145 mm×60 mm, with the screen weighing about 107 grams. In this embodiment, the screen weight is approximately 43 percent of the operating weight of the base. Added stability may be achieved by increasing the base operating weight, but there is a continuing desire to minimize the overall weight of the computer. Therefore, the computer should be stable when the weight of the screen is no less than approximately 33 percent of the weight of the base. In the fully open position, or the viewing position, the screen advantageously forms an approximately 26 degree angle with the base. The angle the screen forms with the base may advantageously vary from 20 degrees to 32 degrees, and is most preferably within the range of 23 degrees to 29 degrees. These angle provide the best compromise between the ideal viewing angle for a reflective screen, the ideal touch input angle, and stability. For a screen that is permanently backlit, the ideal compromise has been found to be approximately 30 degrees. When the screen is in the viewing position, advantageously between approximately 30 percent to 80 percent of the screen area is positioned directly above the base, preferably at least 50 percent to 80 percent, and most preferably 70 percent of the screen positioned directly over the base. By placing a significant portion of the screen directly over the base, the weight of the portion of the screen directly over the base will help prevent tipping.

In the fully open position, the torque associated with pen (not shown) or finger (not shown) contact on the touch screen 4 has been reduced to below the amount that would cause toppling by sufficiently reducing the length of the maximum moment arm, i.e. the length of the distance from the point of application of the turning force to the top of the touch or pen sensitive part of the display to the rotational axis about which the computer would rotate if it were to tip backwards. The base 6 may optionally include a pair of feet 31. When the feet 31 are included, the rotational axis (or pivot point/line) passes through the pair of feet 31 on the underside of base 6. This has been achieved by using the hinge mechanism described above that causes the display 4, when fully opened, to be displaced forward from the approximate position it would be in if the display were hinged at a fixed point at the rear of the display as in a conventional clam shell design. This displacement reduces the length of the moment arm. Moving the display forward shifts the center of gravity of the entire computer forward. This increases the torque resisting backwards tipping and can be a significant effect when a heavy display (e.g. a permanently backlit display) is used. In the Series 5 computer illustrated, the major effect is however the reduction in the moment arm length.

The amount of turning force required to tip the computer is associated with the torque of the base and the torque of the screen. The torque is dependant upon the weight multiplied by the moment arm. Because the weight is not always evenly distributed, the amount of torque contributed varies at each point along both the base and the screen. However, one of ordinary skill in the art can calculate the moment arm and effective weight for each point along both the base and the screen, and thereby calculate the effective weight and moment to accurately determine the base torque and the screen torque. If the base torque is greater than the screen torque plus the torque supplied to the screen by the user, the computer will not tip.

In one embodiment of the invention, used in the Psion Series 5 handheld computer, the typical touch force applied to the touch screen by a user is expected to be approximately 80 g-force. The touch force is assumed, for convenience of the application, to be applied perpendicular to the screen. In this embodiment, the unit begins to tip when a touch force of approximately 220 percent of the typical touch force is applied. The maximum expected touch force is 140 g-force. In order to provide a margin of error, a force of 220 percent of the typical touch force, or approximately 25 percent higher than the maximum expected touch force by the user is a reasonable design goal. A clam shell design hand held computer with the same weight and screen size as the Psion Series 5 would topple backwards if a 140 g-force were applied to the top most touch sensitive portion of the screen. Thus, to prevent tipping, the torque of the base should advantageously be at least 30% greater than the torque provided of the portion of the screen positioned outward of the pivot line plus the torque from the typical touch force applied by the user at the top most sensitive portion of the screen.

Although the Psion Series 5 has been designed with a typical touch force of 80 g-force and will result in backwards tipping if a force of over 175 g-force is applied to the top of the screen, experimental testing has shown that users are sensitive to the feedback given to them by a computer which is about to or actually tips backwards. Users will generally try to modify the touch force used to be below that which will cause backwards toppling. However, relying on users to regulate the force they use is impractical where the tipping force is as low as 80 g-force (a typical touch force for a computer the size of the Psion Series 5) and the computer has the same weight and size as the Psion Series 5. Hence, with the Series 5, the much higher tipping threshold of 175 g-force is used.

A slightly lighter computer will have a lower tipping threshold if it has the same proportions as the Psion Series 5. If the tipping threshold is 140 g-force, then it is feasible to expect a user to train himself, using the feedback of sensing when the computer is about to tip, to lessen the forces that he uses. Feedback of this kind works primarily only when a tipping force just over the threshold causes the computer to tip backwards, but a reduction in force to below the threshold allows the computer to return to its normal position: i.e. the tipping force does not lead to the computer tipping back completely.

Alternatively, a substantially larger and heavier computer may only tip back at a much higher force: for a sub-notebook computer with a total weight of 1.2 Kg, the tipping force for a computer according to the present invention can be 350 g-force. This increase is needed because users generally apply greater forces to larger computers than to small devices such as the Psion Series 5. Overall, a tipping threshold of 220 percent of the typical force is appropriate.

The force applied by a user to operate the touch screen is represented by $F_1$ in FIG. 5. In general, this force is applied perpendicular to the screen. The force $F_1$ can be effectively represented by two separate component forces. One component of the force $F_1$ is directed towards the pivot point at the back edge of the base (in an embodiment without rear stabilizing legs 30 or feet 31), and as a result will not contribute to tipping of the computer. This force is shown as $F_b$. The remaining component of the force $F_1$ is the force that may cause tipping, shown in FIG. 5 as $F_T$. The amount of tipping force $F_T$ multiplied by the appropriate touch moment arm (the distance from the tipping or pivot line of the computer to the touch point on the screen) equals the torque attributable to touching by the user. In one embodiment of the invention, the touch moment arm to the top most touch point on the screen advantageously ranges from 40 mm to 60 mm, preferably 45 mm to 55 mm, and most preferably 50 mm. The touch moment arm ranges are designed to be consistent with the percentage of the screen positioned directly above the base.

In the Psion Series 5, the torque resisting tipping is approximately 245 g×35 mm. The 245 g is the base weight and ignores the display weight. Ignoring the display weight can be done since the display area each side of the pivot line is roughly equal. The 35 mm distance is the approximate distance from the pivot line to the center of gravity of the computer. The overall magnitude of the torque resisting tipping is 8600 g mm. The moment arm length from the pivot line to the uppermost touch point on the screen is approximately 50 mm. When the computer tips backwards, then the tipping force must exceed 8600 g mm divided by 50 mm, which equals approximately 172 g-force, or a tipping force of approximately 175 g-force.

For a heavier and larger sub-notebook, the torque resisting tipping could be approximately 550 g×60 mm, which equals 33000 g mm. If the moment arm to the upper part of the display is 100 mm, then the tipping force must exceed 33000 g mm divided by 100 mm, which equals 330 g-force.

Because the base of the display is displaced forward on being fully opened, the rearward facing lower part of the leaf 1 holding the display can rest upon a rear section 32 of the base 6. This gives rigidity to the leaf 1 with respect to the base 6 in that tapping the touch screen 4 with a pen or finger will not cause the leaf 1 to move backwards. (This effect is different from preventing the computer from toppling backwards: with a conventional clam shell notebook computer with a heavy base, it is usually possible to cause the display to pivot about its hinge to the base by pushing firmly enough with a finger. That occurs when the torque associated with finger pressure is greater than the resistance to the rotational movement of the display associated with the friction of the hinge.) Hence, by shifting the display forward, the current embodiment removes the need to have a complex friction mounting for the leaf 1 or other form of support; instead, the leaf rests firmly against the rear of the base 6 when fully opened.

In this embodiment, a line drawn from the start position of the base of the display when closed to the resting position of the base of the display when fully open will not be exactly horizontal. That is because when the closed computer is placed on a horizontal surface, upper leaf 1 and lower leaf 3 slope down very slightly towards the front of the computer. This is to ensure that, when opened, leaf 3 presents at the right angle to the user for typing. We have referred earlier to the display being displaced forward from, but substantially parallel to, the approximate fully open position it could be in (i.e. for normal viewing and use of the display) if the display were hinged at a fixed point at the rear of the display as in a conventional clam shell design. In the present embodiment, the displacement is both forwards, in the sense of comprising, a horizontal component, as well as downwards, in the sense of comprising a small, vertical component. The words 'forwards' and 'downwards' used in this specification should therefore be construed as not meaning, respectively, an exactly horizontal or vertical displacement, but instead merely including, respectively, a horizontal or vertical component of displacement if one compares the theoretical position the fully opened display would occupy if it were hinged at the rear of the computer as in a conventional clam shell with the position it in fact occupies.

The precise amount of the necessary displacement has been determined by constructing numerous models to test various set-ups.

In addition, as keyboard 5 approaches the end of its extension, the rear end of the keyboard is caused to be slightly raised up, thereby tilting the keyboard more towards the user. That slight tilt increases the ease with which typing can be carried out. In one embodiment of the invention, the keyboard tilts at approximately 6 degrees.

The position of the fully opened keyboard has been carefully designed in order that the torque typically applied to the part of the keyboard closest to the user, in relation to a rotational axis about which the computer would rotate if it were to tip forwards, is less than that needed to cause the computer to tip forwards about that rotational axis. Again, that determination was achieved by testing different mock-ups.

For additional security, an L-shaped lug 25 is provided on a front end of the leaf 3 which can act as a stabilizing foot in the open position as shown in FIG. 5 and which, in the closed position, locks into an aperture (not shown) provided in the front edge of the base 6 to prevent inadvertent opening of the leaf 1.

In one embodiment of the present invention, rear stabilizing legs 30 extend from a back edge 28 of the base 6. There are preferably two stabilizing legs 30, positioned at each side of the base. However, one wide stabilizing leg 30 or more than two stabilizing legs 30 may be used without departing from the spirit of the invention. The rear stabilizing legs 30 effectively extend the pivot line of the computer, thereby requiring a higher force to tip the computer. The rear stabilizing legs 30 could be permanently affixed in the extended position, or could be retractable into the base 6. Retractable legs 30 could be extended manually or connected to extend when the upper leaf 1 opens.

The forces applied to the computer are illustrated in FIG. 8*a*, which shows representations of the base 6 and the screen 4 of the computer. The screen 4 is attached to the base 6 in a viewing position where the screen 4 is at an angle θ from the base 6. As discussed above, in one embodiment of the invention the angle θ is advantageously approximately 26 degrees, as this has been found to be a good compromise between a more direct angle which is preferable for viewing and a flatter angler which is preferable for writing. The touch-point moment arm $T_m$ extends from the pivot point 35 to the touch point on the screen 4.

FIG. 8*b* illustrates the position of screen 4 attached to the base in a clam shell design. By attaching the screen 4 in a clam shell design, the length of the moment arm to the touch point is longer than the touch-point moment arm $T_m$ in FIG. 8*a*. Also, the entire weight of the screen 4 contributes to the tipping force. Therefore, when a screen is attached in the clam shell design, it will tip at a lower force than when attached as in FIG. 8*a*. Applying a typical operating force $F_1$ to the top most touch point on the screen 4 will tip the computer in FIG. 8*b* if the same respective weights and sizes are used for the screen and the base as are used for the computer shown in FIG. 5.

FIG. 8*c* illustrates the computer of FIG. 8*a* with the rear stabilizing legs 30. The rear stabilizing legs effectively extend the length of the base 6, moving the pivot point 35 aft of the back edge 28 of the base 6. If the pivot point 35 is far enough aft, any force applied to the top most touch point on the screen 4 would be applied to the base 6, as shown by force extension line 37. Because the force is applied to the base 6, this embodiment would not tip under any force applied to the top most touch point because there is no tipping moment arm. This assumes, of course, that the total force is directed perpendicular to the screen.

The embodiment described in this specification envisions a display that is hinged towards the rear of the computer, but when fully open rests in a position it would occupy were it hinged far closer to the front of the computer. Other embodiments are within the broader generalizations of the invention. For example, the invention embraces a computer in which the display is fixed in position; i.e. it does not move on hinges at all. Hence the term 'fully opened' does not imply that the display must be openable. Likewise, it embraces a computer in which the display forms the top surface of the lid of the computer, so that with the lid closed, the computer functions as a tablet. But opening the lid using an appropriate hinge may reveal a keyboard.

Further, although the current and foreseeable designs of non-tablet computers will employ a keyboard, it is conceivable that the ergonomic advantages offered by the present invention will render its basic approach suitable for a device in which there is no keyboard at all. Hence, the term 'keyboard' used in this specification should be construed to cover not merely a conventional keyboard, but also any kind of surface, which may or may not provide interaction with the computer. For example, embraced within the invention would be a computer in which the 'keyboard' was simply a plain support on which a user might rest a part of her hand whilst writing on the display with a pen.

What is claimed is:

1. A computer with a touch sensitive or pen sensitive display, wherein the position of the fully opened display is such that the maximum torque typically applied to the top most pen or touch sensitive part of the display, in relation to a rotational axis about which the computer would rotate if it were to tip backwards, is less than that needed to cause the computer to tip backwards about that rotational axis, but would be sufficient to cause such tipping if the display were hinged in a conventional clam shell arrangement at the rear of the computer;

the torque is less than that needed to cause tipping because the length of the moment arm, i.e. the length of the distance from the point of application of the turning force to the rotational axis, is less than the length of the moment arm would be if the display were hinged at a fixed point at the rear of the computer in a conventional clam shell arrangement; and the length of the moment arm is reduced by extending the rear of the computer.

2. The computer of claim 1, wherein the extension is achieved using rearward feet which are permanent.

3. The computer of claim 1, wherein the extension is achieved using rearward feet which extend back as the display opens up.

4. The computer of claim 1, wherein the extension is achieved using rearward feet which are manually extendible.

5. A computer with a touch sensitive or pen sensitive display, wherein the position of the fully opened display is such that the maximum torque typically applied to the top most pen or touch sensitive part of the display, in relation to a rotational axis about which the computer would rotate if it were to tip backwards, is less than that needed to cause the computer to tip backwards about that rotational axis, but would be sufficient to cause such tipping if the display were hinged in a conventional clam shell arrangement at the rear of the computer; the computer comprising a keyboard which extends forward as the display is raised and which tilts slightly towards the user during its extension.

6. The computer of claim 5, wherein the torque typically applied to the part of the keyboard closest to the user, in relation to a rotational axis about which the computer would rotate if it were to tip forwards, is less than that needed to cause the computer to tip forward about that rotational axis.

7. A microprocessor controlled device comprising:
a base having a front edge and a back edge;
a touch or pen sensitive screen having a top and a bottom, said screen mounted to said base when in a viewing position at an angle which is tilted with respect to the base; and wherein at least a portion of the screen is positioned inward from a rotational axis of the base when in a viewing position, the equivalent torque of the portion of the screen positioned inward from a rotational axis of the base combined with the equivalent torque of the base being at least 30 percent greater than the equivalent torque of the portion of the screen positioned outward of the back edge combined with the torque from a typical force applied perpendicular to the screen at a top most touch sensitive portion of the screen, thereby preventing the screen and base from tipping over when the base is on a flat surface and the base is not permitted to slide rearwardly, and wherein any force of more than 220 percent of the typical force applied perpendicular to the screen at a top most touch sensitive portion of the screen causes the screen and base to tip.

8. The microprocessor controlled device of claim 7, wherein the typical force is approximately 80 g-forces.

9. The microprocessor controlled device of claim 7, wherein the device is a palmtop computer.

10. The microprocessor controlled device of claim 7, wherein the device is a sub-notebook computer.

11. A microprocessor controlled device comprising:

a base having a front edge and a back edge, said base having a first weight;

a touch or pen sensitive screen having a top and a bottom, said screen mounted when in a viewing position to said base at an angle which is tilted with respect to the base, the screen having a second weight being no less than 33 percent of the first weight;

wherein the bottom of the screen is positioned between the front edge and the back edge of the base, and said screen further positioned such that when any force of up to 220 percent of a typical force is applied perpendicular to the screen at a top most touch sensitive portion of the screen the base and the screen do not tip over when the base is on a flat surface and the base is not permitted to slide rearwardly; and wherein the typical force is approximately 80 g-forces.

12. A microprocessor controlled device comprising:

a base having a front edge and a back edge, said base having a first weight;

a touch or pen sensitive screen having a top and a bottom, said screen mounted when in a viewing position to said base at an angle which is tilted with respect to the base, the screen having a second weight being no less than 33 percent of the first weight;

wherein the bottom of the screen is positioned between the front edge and the back edge of the base, and said screen further positioned such that when any force of up to 220 percent of a typical force is applied perpendicular to the screen at a top most touch sensitive portion of the screen the base and the screen do not tip over when the base is on a flat surface and the base is not permitted to slide rearwardly; and wherein the first weight is approximately 245 grams.

13. A microprocessor controlled device comprising:

a base having a front edge and a back edge, said base having a first weight;

a touch or pen sensitive screen having a top and a bottom, said screen mounted when in a viewing position to said base at an angle which is tilted with respect to the base, the screen having a second weight being no less than 33 percent of the first weight;

wherein the bottom of the screen is positioned between the front edge and the back edge of the base, and said screen further positioned such that when any force of up to 220 percent of a typical force is applied perpendicular to the screen at a top most touch sensitive portion of the screen the base and the screen do not tip over when the base is on a flat surface and the base is not permitted to slide rearwardly; and wherein the second weight is approximately 107 grams.

14. A method of designing a computer with a touch sensitive or pen sensitive display, comprising the steps of arranging the position of the fully opened display such that the maximum torque typically applied to the top most pen or touch sensitive part of the display, in relation to a rotational axis about which the computer would rotate if it were to tip backwards, is less than that needed to cause the computer to tip backwards about that rotational axis, but, if the display were hinged in a conventional clam shell arrangement at the rear of the computer would be sufficient either to cause such tipping or to cause the display to be rotated away from a normal viewing position; and wherein the computer is a palm top computer and the force associated with the torque typically applied to the top most pen or touch sensitive part of the display is 80 g-force.

* * * * *

UNITED STATES PATENT AND TRADEMARK OFFICE
CERTIFICATE OF CORRECTION

| | |
|---|---|
| PATENT NO. | : 7,355,843 B2 |
| APPLICATION NO. | : 10/984472 |
| DATED | : April 8, 2008 |
| INVENTOR(S) | : Martin Philip Riddiford |

It is certified that error appears in the above-identified patent and that said Letters Patent is hereby corrected as shown below:

In Column 1, Line 12, delete "application" and insert -- Application --, therefor.

In Column 5, Line 41, delete "refracted" and insert -- retracted --, therefor.

Signed and Sealed this

Fourteenth Day of October, 2008

JON W. DUDAS
*Director of the United States Patent and Trademark Office*